INVENTORS
DAVID J. FURZE
JOSEPH L. LAGASSE
VILMOS G. FODOR

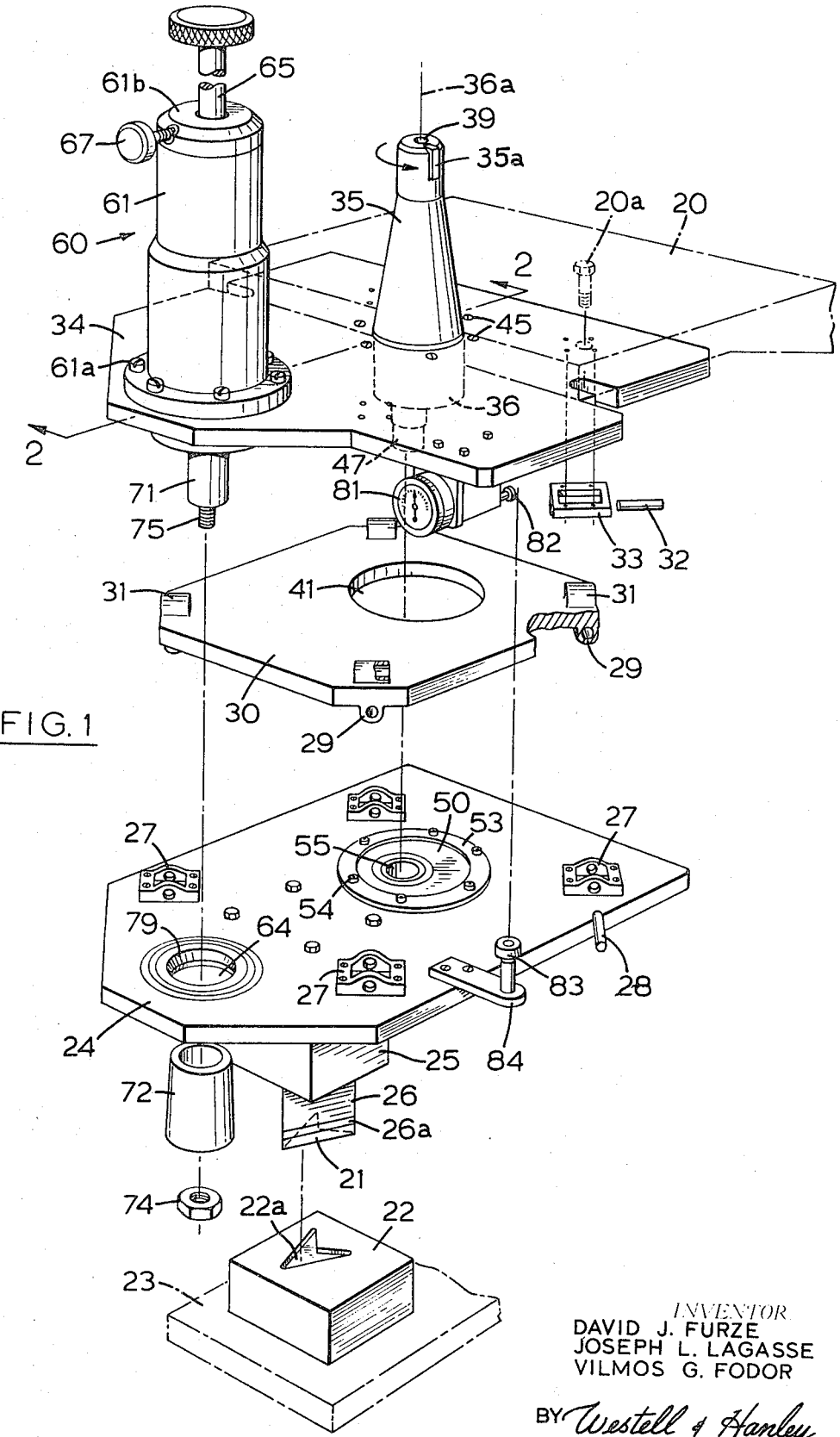

BY Westell & Hanley

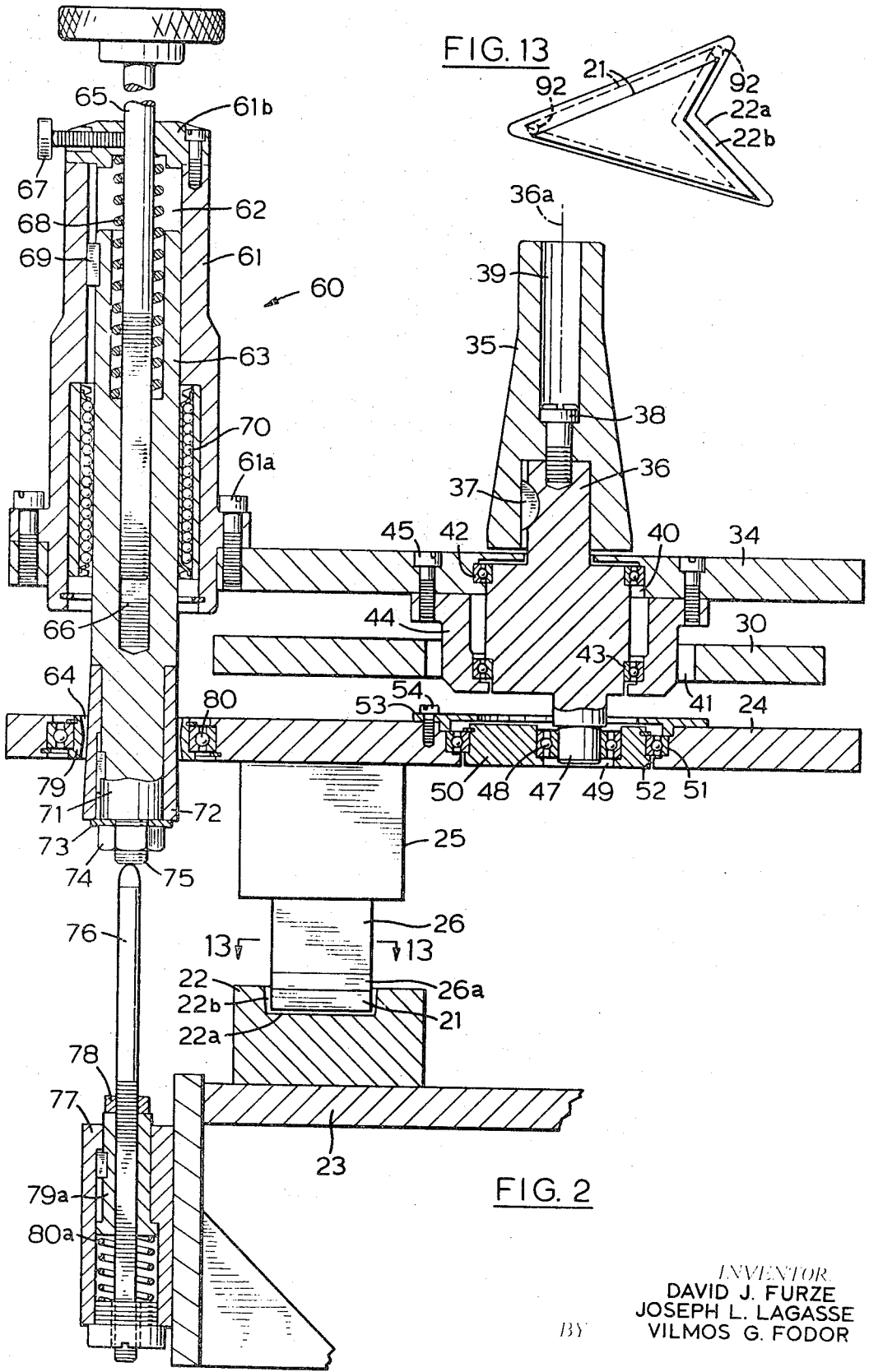

United States Patent Office 3,539,754
Patented Nov. 10, 1970

3,539,754
VARIABLE ECCENTRIC OVERCUTTING ELECTRICAL DISCHARGE MACHINING DEVICE
David James Furze, Chateauguay, Quebec, and Joseph Louis Lagasse and Vilmos Gyula Fodor, Montreal, Quebec, Canada, assignors to Northern Electric Company Limited, Montreal, Quebec, Canada
Filed Aug. 31, 1967, Ser. No. 664,750
Int. Cl. B23p 1/08, 1/12
U.S. Cl. 219—69                                9 Claims

ABSTRACT OF THE DISCLOSURE

An apparatus for the electrical discharge machining of a die opening or cavity in which the electrode is orbited by lateral reciprocation in two mutually transverse directions to increase the overcut. An eccentric on a drive shaft engages a circular disc cam which is rotatable on the eccentric and in a matching aperture in a platen carrying the electrode. The throw of the cam is adjustable by a non-reciprocating projection loosely engaging a second aperture in the platen.

---

The present invention relates to the formation of stamping die openings or moulding die cavities in workpieces and more particularly to the electrical discharge machining of such openings or cavities.

In the manufacture of a stamping die the opening may be formed directly by using an extended die punch as the electrode without the necessity of machining a separate electrode, the eroded extension of the punch being removed after the machining has been completed. Unfortunately the lateral overcut is not usually large enough to accommodate the thickness of the sheet material to be stamped in the die opening. While large overcuts are obtainable the resulting surface of the opening or cavity does not have the degree of smoothness required to prevent sticking of the finished part in the cavity after stamping. To obtain a fine finish very small overcuts with low amperage must be used and as many as six different sizes of electrodes may be employed to produce the finished opening. Alternatively an oversize punch may be used as an electrode to obtain the required overcut and subsequently machined to size but this can lead to undesirable deviations in the matching of the punch to the opening or the plug to the cavity.

Another disadvantage of the use of conventional electrical discharge machining apparatus is the cost of adding a draft angle or negative taper to the wall of a mould cavity to produce a bell-mouth or the cost of adding a back taper to the wall of a punch die opening. These tapers are necessary to prevent the stamped or moulded part from sticking in the opening or cavity.

An object of the invention is to provide a method and apparatus for electrical discharge machining of openings or cavities in which the magnitude of the overcut is selectively variable with a single electrode.

It is a further object of the invention to provide a method and apparatus for electrical discharge machining of openings or cavities having sidewalls of varying configuration in vertical cross-section.

An example embodiment of the invention is shown in the accompanying drawings in which:

FIG. 1 is an exploded view in perspective of an electrode discharge machining device according to the invention, mounted in association with a workpiece;

FIG. 2 is a cross-section taken along line 2—2 of FIG. 1;

Figure 4:
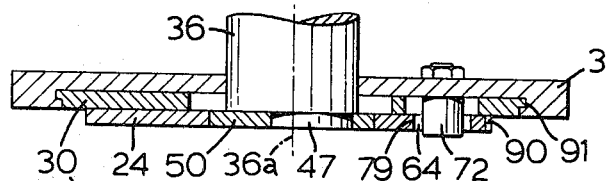
FIG. 4 is a cross-section taken along the line 4—4 of FIG. 3.
Figure 3:
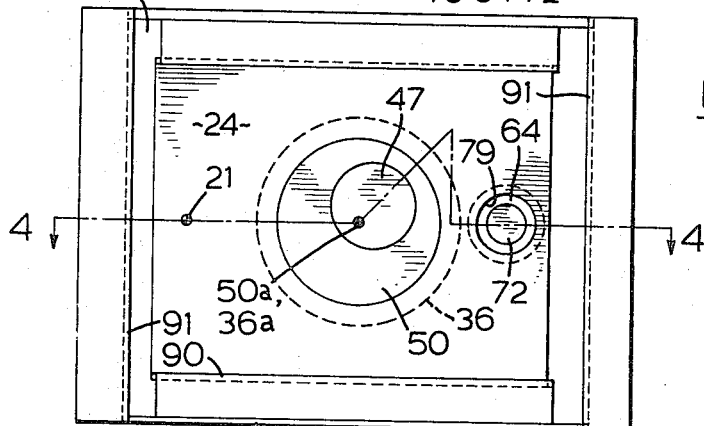
FIG. 3 is a diagrammatic underside view of the device of FIG. 1 in an initial position of rest.

FIGS. 5 to 12 inclusive are underside views of the platen similar to FIG. 3 but showing successive positions the elements on rotation of the crank shaft at increments of 45 degrees; and FIG. 13 (on the same sheet as FIG. 2) is a cross-section taken along line 13—13 of FIG. 2.

The apparatus shown in FIG. 1 is mounted on a fixed support 20 by bolts 20a and carries an electrode 21 positioned above an electrically conductive workpiece 22 which is mounted on another fixed support 23. Electrode 21 has the transverse cross-sectional shape of the opening or cavity to be machined, as shown more particularly in FIG. 13. FIGS. 2 and 13 show an opening or cavity 22a being formed by electrode 21 with a lateral overcut 22b between the electrode and the side wall of the opening or cavity.

The apparatus comprises a platen 24 having mounted on its underside an electrode clamping means 25 to which an electrode holder 26 is fixed and which in turn carries electrode 21 separated from holder 26 by insulation 26a. Electrode 21 can be mounted directly on platen 24 if desired. Platen 24 carries on its upper side four journal brackets 27 which engage, through axially parallel pins 28 lying in a single plane, bosses 29 carried on the underside of an intermediate plate 30. On its upper side intermediate plate 30 also carries four bosses 31 engageable, through axially parallel pins 32 lying in a single plane with further journal brackets 33 carried on the underside of an upper support plate 34 which is fixed to support 20. Pins 32 are preferably axially perpendicular to pins 28 and their plane is parallel to but offset from the plane of pins 28. It will be seen from this construction that platen 24 and intermediate plate 30 act as cross-slides each having a limited reciprocating movement parallel to support plate 34 and parallel one to the other.

The drive mechanism of the apparatus consists of a coupling 35 rigidly connected with a crankshaft 36 by a key 37 and by a bolt 38 set in a recess 39. Coupling 35 is connectible with a rotary drive shaft (not shown) through a key 35a. Crankshaft 36 having a rotational axis 36a extends through an aperture 40 in support plate 34 and through an aperture 41 in intermediate plate 30. Crankshaft 36 is journally mounted in support plate 34 by bearings 42 and by bearings 43 in an annular housing 44 which is fixed by bolts 45 to support plate 34 and which also extends through aperture 41.

The lower end of crankshaft 36 carries offset from its rotational axis a stub shaft or eccentric 47 which is journalled by bearings 48 in an aperture 49 of a floating circular disc cam 50. Journal bearings 51 carry cam 50 in an aperture 52 in platen 24. A ring 53, secured to the top of platen 24 by screws 54, anchors bearings 51 in aperture 52.

Support plate 34 carries a guide assembly 60 laterally offset from coupling 35 and crank shaft 36. Guide assembly 60 consists of a housing 61 fixed by bolts 61a to support plate 34. Housing 61 defines a vertical passage 62 through support plate 34 in which a guide shaft in the form of a plunger 63 is axially movable. Plunger 63 projects downwardly from housing 61, clearing intermediate plate 30 and passing loosely through an aperture 64 in platen 24. A removable adjusting screw 65 projects into passage 62 of housing 61 through a top end cap 61b and engages a threaded bore 66 in plunger 63, the adjusting screw being releasably locked by a clamping screw 67 also mounted in cap 61a of housing 61. A compression spring 68 concentric with adjusting screw 65 bears at one end against cap 61b of housing 61 and at the other end against plunger 63 which is slidably engaged with a key 69 to prevent axial rotation. Annular bearings 70 concentric with plunger 63 facilitate the vertical axial movement of the plunger. The lower end of plunger 63 is annularly recessed to form a neck 71 receiving a master or guide bushing 72 which is removably secured on the neck by a washer 73 and a nut 74 engaging a threaded boss 75 projecting downwardly from neck 71. When plunger 63 is in its downwardly extended position boss 75 bears against a vertical abutment rod 76 mounted on fixed support 23. Rod 76 is vertically slidable in a housing 77 and is threaded to receive a lock nut 78 for vertical adjustment. Lock nut 78 bears against a vertically slidable collar 79a which in turn bears against a stiff clamping spring 80a.

A follower ring 79 is journally mounted concentrically in aperture 64 by bearings 80.

A dial indicator 81 (see FIG. 1) is mounted on the underside of support plate 34 and is actuated by a plunger 82 bearing transversely against a vertical post 83 fixed by a flange 84 to platen 24. Preferably the action of plunger 82 is dampened by a dash-pot (not shown).

The operation of the apparatus is shown in FIGS. 3 to 13 of the drawings where the assembly is represented diagrammatically for purposes of illustration. Platen 24 is shown slidable in guides 90 (equivalent to pins 28) on intermediate plate 30 while the intermediate plate is slidable (together with platen 24) in guides 91 (equivalent to pins 32), on support plate 34, perpendicular to guides 90. Electrode 21 is represented by a locus on platen 24. In an initial position of rest of crankshaft 36 guide bushing 72 may be located anywhere within the confines of follower ring 79; in FIG. 3 the bushing is shown centrally located within the ring and in this location rotational axis 50a of floating cam 50 is coincident with rotational axis 36a of crankshaft 36.

Figure 5:
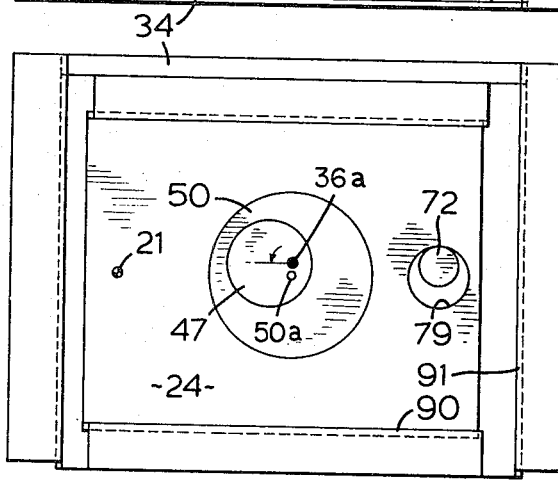
Figure 6:
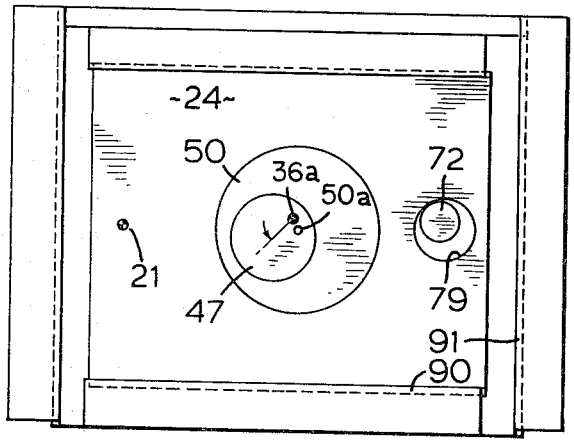
Figure 7:
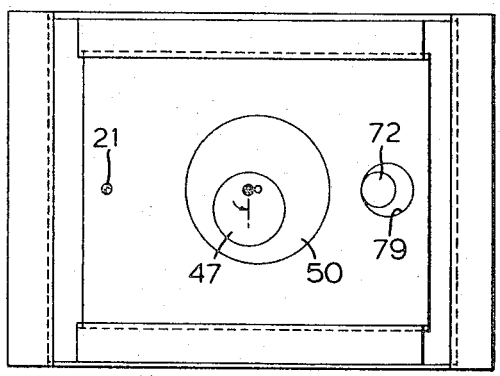
Figure 10:
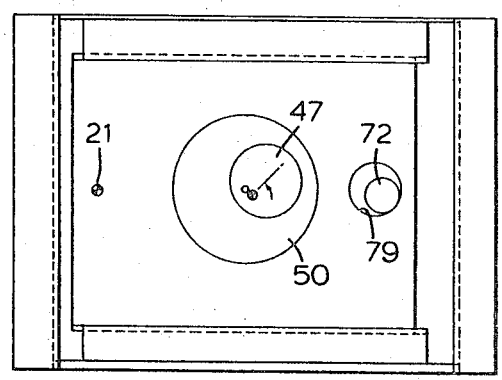
Figure 8:
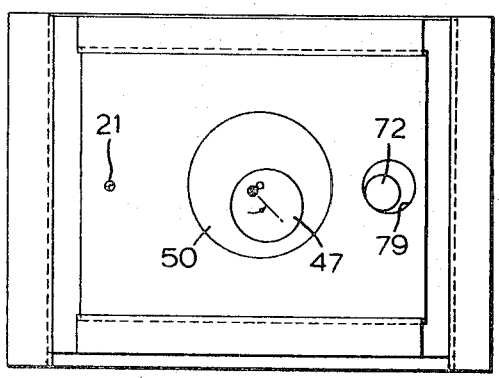
Figure 11:
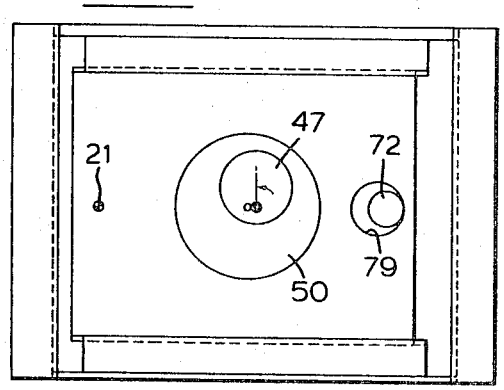
Figure 9:
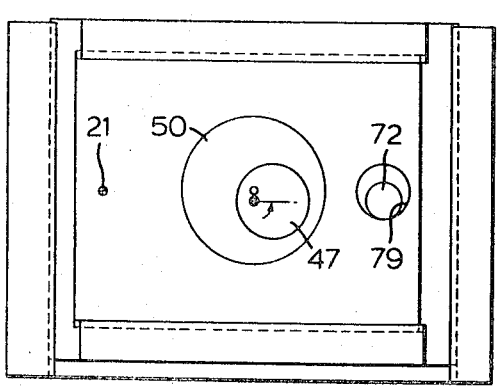

Initial counter-clockwise movement of crankshaft 36, as seen in FIG. 5, causes slippage between cam 50 and eccentric 47 due to inertia of the cam and to frictional forces in the bearing. This moves axis 50a out of alignment with axis 36a and brings the throw of cam 50 into play. The throw of cam 50 increases as axis 50a becomes increasingly displaced from axis 36a, i.e. as the cam continues to slip on eccentric 47. As the throw of cam 50 is increased it causes platen 24 and intermediate plate 30 to slide in guides 90 and 91 respectively which brings follower ring 79 into contact with guide bushing 72, as shown in FIG. 5. Once contact is made between ring 79 and bushing 72 the throw of cam 50 is restrained from further increase, thereby governing the magnitude of the reciprocating motion of platen 24 and intermediate plate 30. Also, no further slippage occurs between eccentric 47 and cam 50 which in effect locks them together, thus locking the floating cam to crankshaft 36.

Figure 12:
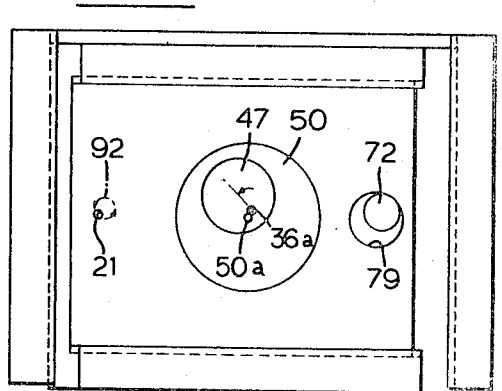

Continued counter-clockwise rotation of crankshaft 36, with cam 50 locked to the crankshaft in a maximum offset position governed by bushing 72, moves both platen 24 and intermediate plate 30 laterally with respect to support plate 34 and normally with respect to one another as seen progressively in FIGS. 6 to 12 inclusive which show the rotation of the crankshaft at intervals of 45°. It will be noted that bushing 72 is continuously in contact with ring 79 and axis 50a of cam 50 rotates about axis 36a of crankshaft 36 at a set distance. The reciprocal movement of platen 24 and intermediate plate 30 is translated into an orbital movement of electrode 21 which orbits in a path 92 as shown in FIGS. 12 and 13 of the drawings reproducing the transverse cross-sectional shape of bushing 72 in the plane of ring 79. The radius of orbit 92 is equal to the throw of eccentric 47 plus the throw of cam 50. Furthermore, the radius of orbit 92 is equal to the difference between the radius of ring 79 and the radius of bushing 72.

The orbital path of electrode 21 determines the size of the overcut which is the sum of the spark gap and the orbital radius of the electrode. An overcut of a given magnitude can be obtained by choosing a bushing 72 of suitable radius. In practice, overcuts of up to .012 are obtainable with a good surface finish while still retaining the inexpensive method of machining the electrode coextensively with the punch or plug whereas in conventional equipment overcuts above .0045" are not available and overcuts above .002" are not acceptable due to surface finish requirements. Moreover the orbiting motion of the electrode causes the particles present between the electrode and the wall of the cavity to flow more freely which substantially reduces the problem of controlling the arcing for accurate machining of the die opening or cavity.

Use of guide assembly 60 allows an easy selection of a desired overcut size. To obtain any given radius of orbit of electrode 21, a tapered bushing 72 is used. Plunger 63 which carries bushing 72 is axially adjusted by screw 65 until the desired diameter of the bushing is in the plane of contact with ring 79 in platen 24 as measured by dial gauge 81. Adjusting screw 65 is then clamped by screw 67 and a continuous orbit of uniform radius is provided. It should be noted that abutment rod 76 is at all times clear of boss 75 as the apparatus is advanced by ram 20 towards workpiece 22.

To obtain a vertical taper of the die opening or cavity wall the downwardly advancing movement of the whole assembly is utilized. A bushing 72 having a taper inversely proportional to the desired taper of the die opening or cavity is mounted on plunger 63. Adjusting screw 65 is then removed from housing 61 leaving compression spring 68 free to urge boss 75 against abutment rod 76 which is adjusted by means of lock nut 78 to locate bushing 72 correctly in relation to ring 79. As the apparatus is advanced towards workpiece 22 bushing 72 is held stationary by rod 76 and a plunger 63 compresses spring 68. By this means the maximum throw of floating cam 50 and consequently the maximum orbit of electrode 21 is varied inversely as the radius of the bushing at the point in contact with ring 79, thus producing an inversely proportional taper in the wall of the die opening or cavity as shown in FIG. 2. It will be appreciated that back tapered openings or cavities may be produced in this manner although the difference between the minimum and maximum diameters of the back taper would be governed by the magnitude of the initial orbit of the electrode and an insulated electrode such as that shown in FIG. 2 would be used. However, the angle of back taper could be increased by machining the free end of the electrode to a smaller diameter.

A non-rotational path other than a circular orbit, such as an elliptical orbital path, may be preselected by the present invention by providing a ring 79 of a shape corresponding to the desired path. Where a non-circular ring 79 is employed the throw of cam 50 would vary during each rotation of crankshaft 36, i.e. the cam would not be locked with the crankshaft. It will be appreciated that such a movement would produce sharper corners than circular orbital movement. For abrupt changes of throw such as caused by an angular orbital path a follower of a very small transverse diameter would preferably be used in place of bushing 72, together with an electrode of very small cross-section with respect to the opening or cavity formed thereby.

We claim:

1. In a machine for forming an opening or a cavity in a conductive workpiece by electrical discharge machining in which an electrode is advanced axially towards the workpiece and current is passed from the electrode to the workpiece by arcing, apparatus comprising:
   (a) an electrode fixed on an advanceable platen and adapted to reciprocate in two mutually transverse directions in a plane transverse to the longitudinal axis thereof;
   (b) an eccentric engageable with a drive shaft and engaging a circular disc cam, said cam engaging a first aperture of matching circumference in the platen and being freely rotatable about the eccentric and within the aperture of the platen; and (c) a non-reciprocating projection loosely engageable by a second aperture in the platen offset from the first aperture;

whereby the throw of the cam is adjustable to achieve a predetermined non-rotatable orbital path of the electrode about said axis.

2. Apparatus as claimed in claim 1 in which the projection carries removable means engageable by said second aperture.

3. Apparatus as claimed in claim 2 in which the projection comprises a bushing removably fixed on a shaft, the shaft being longitudinally adjustable perpendicularly to the platen.

4. Apparatus as claimed in claim 1 in which the projection is removably fixed on an axially resilient plunger adapted to bear in a direction parallel to the direction of advancement of the electrode, against a fixed abutment.

5. In an apparatus for forming an opening or a cavity in a conductive workpiece by electrical discharge machining:

(a) a platen having an electrode fixed on one face thereon;

(b) a support plate parallel to and spaced from the platen on the side thereof opposite the electrode;

(c) an intermediate plate positioned between the platen and the mounting plate and parallel thereto;

(d) the platen being mounted on the intermediate plate for reciprocation in one direction in the plane of the platen;

(e) the intermediate plate being mounted on the mounting plate for reciprocation in one direction in the plane of the intermediate plate and perpendicular to the direction of reciprocation of the platen relative to the intermediate plate;

(f) a circular disc cam journally mounted in the platen in the plane thereof;

(g) an eccentric journally engaging the cam eccentrically therewith;

(h) means to couple the eccentric with a drive shaft; and (i) guide means mounted on the support plate and projecting loosely through a follower ring journally mounted in an aperture in the platen offset from the cam.

6. Apparatus as claimed in claim 5 in which the eccentric is fixed on a crankshaft journally mounted on the support plate.

7. Apparatus as claimed in claim 5 in which the guide means comprises a bushing removably fixed to a guide shaft mounted on the support plate and projecting loosely through the ring in the platen.

8. Apparatus as claimed in claim 7 in which the guide shaft is releasably clamped to the support plate and axially adjustable transverse to the plane of the platen.

9. Apparatus as claimed in claim 8 in which the guide shaft is adapted to bear at its end projecting through the ring in the platen against a fixed abutment adjustable longitudinally of the guide shaft, and spring means urging the guide shaft against the abutment whereby when the guide shaft is unclamped and the support plate is moved towards the workpiece the guide shaft will remain stationary and the wall of the cavity in vertical cross-section will be configured inversely to the vertical cross-sectional configuration of the bushing.

References Cited

UNITED STATES PATENTS

| | | |
|---|---|---|
| 3,135,852 | 6/1964 | Bentley et al. |
| 3,240,914 | 3/1966 | Hill et al. |
| 3,322,929 | 5/1967 | Mayer et al. |

RALPH F. STAUBLY, Primary Examiner